(12) United States Patent
Thomasson et al.

(10) Patent No.: US 10,728,290 B1
(45) Date of Patent: *Jul. 28, 2020

(54) DEVICES WITH CALLING APPS FOR INMATE CALLS, INFORMATION SHARING, MONITORING, AND OTHER FUNCTIONS

(71) Applicant: CONFINEMENT TELEPHONY TECHNOLOGY, LLC, Greensboro, NC (US)

(72) Inventors: Todd Russell Thomasson, Elon, NC (US); Margaret Suzanne Haffner, Covington, TX (US); Zachary Alan Way, McLeansville, NC (US); Timothy Edwin Pabon, Greensboro, NC (US); Johnnie Richard Tayloe, Rural Hall, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,758

(22) Filed: May 9, 2019

Related U.S. Application Data

(63) Continuation of application No. 15/788,327, filed on Oct. 19, 2017, now Pat. No. 10,412,125, which is a
(Continued)

(51) Int. Cl.
*H04L 29/06* (2006.01)
*H04L 12/18* (2006.01)
*H04M 3/38* (2006.01)
*H04L 29/08* (2006.01)
*H04M 7/00* (2006.01)
(Continued)

(52) U.S. Cl.
CPC ...... *H04L 65/1076* (2013.01); *H04L 12/1818* (2013.01); *H04L 51/046* (2013.01); *H04L 65/1046* (2013.01); *H04L 65/1069* (2013.01); *H04L 67/141* (2013.01); *H04L 67/325* (2013.01); *H04M 3/38* (2013.01);
(Continued)

(58) Field of Classification Search
CPC ............. H04L 65/1066; H04L 65/1069; H04L 65/1073; H04L 65/1076; H04L 67/325; H04L 51/046; H04M 7/006
See application file for complete search history.

(56) References Cited

U.S. PATENT DOCUMENTS 5,926,533 A  7/1999  Gainsboro
7,248,680 B1  7/2007  Gainsboro
(Continued)

*Primary Examiner* — Kevin D Mew
(74) *Attorney, Agent, or Firm* — Thompson Hine LLP

(57) ABSTRACT

Systems and techniques for permitting, establishing, monitoring and controlling calls based on messages from outside parties, outside party availability information, institution's call restriction information, and/or account holder preferences. In one example, a message from an outside party app on an outside party computing device is receive by an inmate app on an inmate device. The inmate device displays the message at the inmate calling app including a request for the inmate to call the outside party device during a time period. When the inmate initiates a call to the outside party the call is permitted or not permitted based on determining whether the call is within the specified time period.

15 Claims, 6 Drawing Sheets

Related U.S. Application Data continuation of application No. 15/602,658, filed on May 23, 2017, now Pat. No. 9,826,003.

(60) Provisional application No. 62/415,924, filed on Nov. 1, 2016.

(51) Int. Cl.
*H04L 12/58* (2006.01)
*H04M 3/42* (2006.01)

(52) U.S. Cl.
CPC ........ *H04M 7/006* (2013.01); *H04M 3/42365* (2013.01); *H04M 2203/2072* (2013.01)

(56) References Cited

U.S. PATENT DOCUMENTS

| | | | |
|---|---|---|---|
| 7,529,357 B1 | 5/2009 | Rae | |
| 7,860,222 B1 | 12/2010 | Sidler | |
| 7,881,446 B1 | 2/2011 | Apple | |
| 7,899,167 B1 | 3/2011 | Rae | |
| 8,340,260 B1 | 12/2012 | Rae | |
| 8,654,956 B2 | 2/2014 | Ryan, III | |
| 8,798,035 B1* | 8/2014 | Passe | H04L 12/66 370/252 |
| 9,232,051 B2* | 1/2016 | Torgersrud | H04M 3/38 |
| 9,300,791 B1* | 3/2016 | Higgs | H04M 3/2281 |
| 9,614,974 B1* | 4/2017 | Hodge | H04M 7/0078 |
| 9,723,040 B1* | 8/2017 | Lubbehusen | H04L 43/10 |
| 9,832,313 B1 | 11/2017 | Way | |
| 9,992,330 B1 | 6/2018 | Hodge | |
| 10,050,668 B1* | 8/2018 | Keiser | H04B 3/54 |
| 2009/0067604 A1 | 3/2009 | Apple | |
| 2009/0207987 A1 | 8/2009 | Ryan | |
| 2012/0014517 A1 | 1/2012 | Orr | |
| 2012/0176466 A1 | 7/2012 | Wrench | |
| 2013/0044867 A1 | 2/2013 | Walters | |
| 2013/0150004 A1 | 6/2013 | Rosen | |
| 2013/0152192 A1 | 6/2013 | Dischamp | |
| 2013/0194377 A1* | 8/2013 | Humphries | H04N 7/15 348/14.08 |
| 2013/0263227 A1* | 10/2013 | Gongaware | H04L 63/08 726/4 |
| 2014/0270126 A1* | 9/2014 | Torgersrud | H04M 3/38 379/189 |
| 2014/0273929 A1* | 9/2014 | Torgersrud | H04M 15/886 455/406 |
| 2015/0319612 A1* | 11/2015 | Hodge | H04L 63/0861 455/411 |
| 2016/0028786 A1* | 1/2016 | Hanna | G06Q 10/06 709/219 |
| 2017/0134468 A1 | 5/2017 | Togersrud | |

\* cited by examiner

DEVICES WITH CALLING APPS FOR INMATE CALLS, INFORMATION SHARING, MONITORING, AND OTHER FUNCTIONS

RELATED APPLICATIONS

This patent application is a continuation of U.S. patent application Ser. No. 15/788,327, filed on Oct. 19, 2017, which is a continuation of U.S. patent application Ser. No. 15/602,658, filed on May 23, 2017 (now U.S. Pat. No. 9,826,003), which claims the benefit of U.S. Provisional Application No. 62/415,924 filed on Nov. 1, 2016, entitled "DEVICES WITH CALLING APPS FOR INMATE CALLS, INFORMATION SHARING, MONITORING, AND OTHER FUNCTIONS," which are incorporated herein by this reference in their entireties.

FIELD OF THE INVENTION

This disclosure relates generally to devices and systems associated with inmate communications, information, and services.

BACKGROUND

Various communication systems are used to enable inmates of prisons and other institutions to talk with loved ones, friends, attorneys, and others who are outside of the institution. Unfortunately, inmates and these outside parties are not always able to connect due to availability, timing, and call restrictions. For example, an inmate may try to call home to the inmate's mom during calling hours set by the institution and happen to call when the mom has stepped out, has a visitor, or is otherwise not available. Similarly, an inmate may be unable to contact an attorney if the attorney is on another call, in court, or otherwise unavailable. In addition, inmate calls are often restricted so that only calls initiated by the inmate are permitted. The inmate's family and contacts outside of the institution are often thus required to wait for a call from inmate, which is burdensome and often results in calls occurring at inconvenient times and places.

Inmate calling systems generally charge inmates (or the called parties) for the calls between the inmate and called parties. The rates charged for these calls are generally used to, among other things, pay carrier charges to reach the called parties over conventional telephone lines. In addition, use of these carrier-based systems can impose various restrictions. For example, carrier network limitations in existing systems limit interface compatibility with Dual Tone Multi-Frequency (DTMF) signals and impose restrictions that result in undesirable routing of calls. In many instances, least cost routing techniques are employed that frustrate the use of DTMF signals. Such least cost routing techniques will route calls over the least expensive carrier regardless of whether that carrier uses switches in all Point Of Presences (POPs) that can understand DTMF signals coming from a called party, e.g., when a party presses "3" to accept a call, etc. As a result, many calls that involve DTMF signals cannot be completed without manually changing from the least cost carrier to another carrier for the individual phone number. This is inefficient, frustrating for customers, and burdensome of the providers. Thus, although many inmate calling systems use Voice Over Internet Protocol (VOIP) for communications within the institution and from the institution to monitoring and control systems, the communications generally interface with conventional phone lines and cellular phones, incur calling carrier charges, and often must manually work around burdensome restrictions.

SUMMARY

Systems and techniques are disclosed for permitting, establishing, monitoring and controlling VOIP calls based on messages from outside parties, outside party availability information, an institution's call restriction information, and/or account holder preferences. In one example, a message from an outside party app on an outside party computing device is receive by an inmate app on an inmate device. The inmate device displays the message at the inmate calling app including a request for the inmate to call the outside party device during a time period. When the inmate initiates a call to the outside party, the call is permitted or not permitted based on determining whether the call is within the specified time period. In another embodiment of the invention, availability information is received from an outside party app on an outside party computing device by an inmate app on an inmate device. The inmate device displays the availability information to the inmate and permits calls based on whether the calls are within time periods during which the outside party is available. In another example, the apps additionally or alternatively determine whether to permit calls based on institution call restriction information.

DETAILED DESCRIPTION

Figure 1:
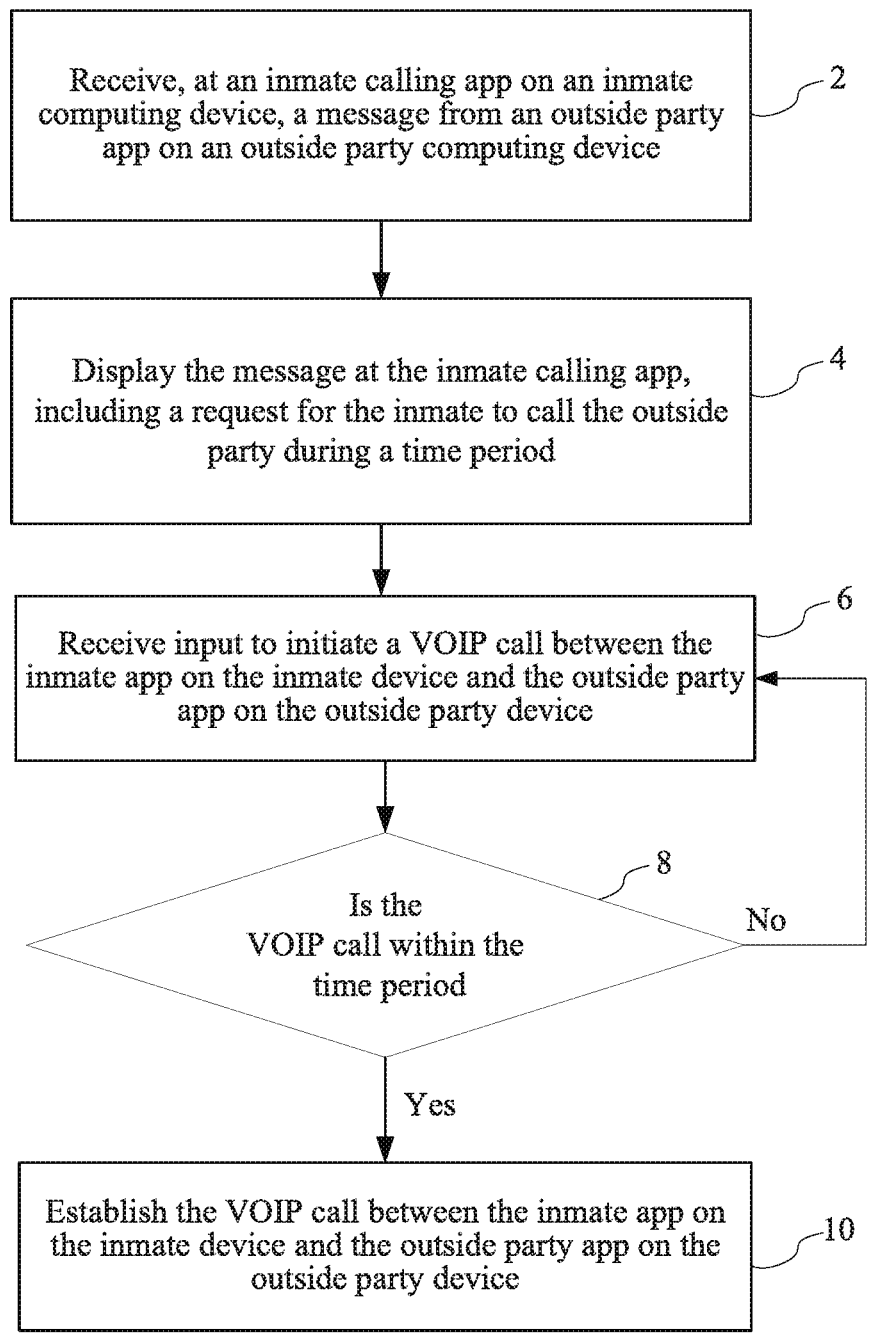
FIG. 1 is a flow chart illustrating an exemplary method of establishing a VOIP call based on a message from an outside party app requesting the inmate to call the outside party during a time period.

As described above, existing confinement institution call systems are often unable to connect inmates with called parties due to availability, timing, and restrictions (such as carrier network limitations in existing systems that limit interface compatibility with DTMF signals, and restrictions that result in undesirable call routing) and involve costly rates due to incurred carrier charges for using conventional telephone networks. Embodiments of the invention facilitate inmate calls at suitable and convenient times, without incurring carrier charges, and avoid the restrictions of the existing calling techniques.

IP-Based Calling

Certain embodiments of the invention provide the family, friends, and other outside parties called by an inmate with the capability of conducting IP-based calls using a Wi-Fi enabled device, such as a tablet, laptop, or a mobile phone with Wi-Fi capability, and an Internet connection. The communications between devices are controlled using apps on the devices that can communicate with one another via direct network communications (e.g., without invoking carrier services). The rate charged for the call can be less than the rate charged for calls made using existing systems since no carrier charges are invoked and the restrictions of the carrier services are avoided. The called party also avoids using a cellular plan minutes and data consumption for the call, for example, when using Wi-Fi. A VOIP connection from an app on the inmate's device to an app on the outside party's device can be established to avoid carrier charges, cellular charges, etc. This also removes carrier impediments to call completion such as incorrect call routing and misconfigured DTMF settings.

Calling Apps with Enhanced Features, Inmate Controls and Restricted Calling Capabilities Certain embodiments of the invention use specialized apps on electronic devices to send communications (e.g., VOIP messages) to enable inmate calls. An outside party with a suitable electronic device having Wi-Fi capability and an Internet connection loads the specialized app onto the device. The inmates have their own version of the same or similar app. The outside party's app and the inmate's app communicate with one another (directly or through a server) via a network such as the Internet for calls and to share information. The apps can provide various features specific to providing services to inmates and outside parties including, but not limited to, online/offline availability statuses, missed call notifications, billing notifications (e.g., low balance, no balance), features for making payments and setting up auto-payments to pay for calls and other services, options to store payment methods, and features to authorize adding funds prior to the call and at the conclusion of the call.

In addition, the apps can limit the inmates' calling capabilities and provide other controls to ensure that the calling platform is not used for forbidden purposes and otherwise abused. For example, restrictions are enforced so that the inmates cannot call victims or other blocked parties, to monitor calls, to verify inmate and outside party identities, and to provide other control functions. In one embodiment of the invention, an app on a device of an outside party accesses the device's GPS to ensure that the outside party is at an allowed or known location and only enables calls with the inmate while the outside party is at the allowed location.

Calling Apps that Share Availability and/or Time Restriction Information

Apps that are used to enable inmate calling can also collect and share information about call timing restrictions, inmate availability, outside party availability, and institution schedules and restrictions. The shared information can make inmate calls significantly more convenient for the inmate, the outside parties, and the institution. Techniques that use the shared information can preserve system resources and improve system efficiency by reducing unsuccessful call attempts, in addition to providing numerous other advantages.

i. Outside Party Availability

In one embodiment of the invention, when the outside party launches the app or selects an "I am available" option within the app, the app sends a message over the network to the inmate's device and a graphic or other message is displayed on the inmate's device letting the inmate know that the outside party is available to receive a call. The inmate can then select an option to call the outside party to initiate a call with the outside party. If the inmate does not see that the outside party is available, the inmate can avoid (or be automatically prevented from) wasting his/her time and the system's resources with an unsuccessful call attempt.

In other embodiments of the invention, additional details about the outside party's availability are shared with the inmate. For example, the outside party may enter or select a time period that he or she will be available, e.g., "available for the next 15 minutes," "available for the next hour," etc.

As another example, the outside party may enter or select individuals who are available at the location for a call with the inmate, e.g., "Mom, Joe, and Johnny are available." The outside party can select names from an approved called party list to identify the people that are available and subsequently voice verification techniques can be used to ensure that the call participants are limited to the people who were identified.

As another example, the outside party may enter or select an indication of how preferable/convenient a call would be at this time and other times, for example, selecting one of the following options "Call us now," "Great time for a call," "Available for a call," "Only emergency calls," "Wait until _p.m. to call," (with the "_" time specified by the outside party), "No calls now," etc.

As another example, the outside party is able to send a custom message describing the outside party's availability, e.g., by typing a message "Please call us between 1:00 and 1:30 while your sister is here." In one example, the outside party is limited to providing a custom message by filling in times, names, and/or values in set message templates.

In yet another example, the outside party is able to specify availability for upcoming time periods, for example, checking boxes for the days of the upcoming week or month that the outside party will be available. This is particularly useful in allowing an inmate to realize, for example, that now is the only time in the next three weeks that he will be able to talk with his son, and similar issues.

In another example a counselor is able to provide a schedule of available single instance and/or recurring time slots for inmates to call. For example, an inmate my schedule weekly one hour video calls with a counselor on Tuesday mornings at 10 am. The inmate can do this using an interface that shows the inmate when the counselor has available time slots based on information provided by the counselor. Once scheduled, the inmate and/or the counselor can be reminded of the one-time and/or recurring appointments prior to the appointments and or at the start of each appointment.

Generally, any availability selections or messages can also be provided to the institution or other monitoring service to monitor for abuse. The exemplary messages described above are merely examples of the availability information that is shared from the outside party device to the inmate's device. Such messages can use any form that is appropriate for the implementation and/or circumstances.

FIG. 1 is a flow chart illustrating an exemplary method 1 of establishing a VOIP call based on a message from an outside party app requesting the inmate to call the outside party during a time period. The exemplary method 1 can be implemented by an inmate device such as by apps 59a-c on one of inmate devices 57a-c (FIG. 5), although other devices and configurations can also be implemented. The exemplary method 1 can be implemented by storing and executing instructions in a non-transitory computer-readable medium. Reference to the method 1 being performed by a computing device includes the method 1 being performed by one or more computing devices.

Method 1 involves receiving, at an inmate calling app on an inmate computing device, a message from an outside party app on an outside party computing device, as shown in block 2. For example, the mother, father, brother, sister, child, or friend of the inmate may open the non-inmate app on a tablet, mobile phone, laptop, or desktop computing device and select an option to send a message to the inmate to "call me now," "call me in the next half hour," "call me this afternoon," etc. The non-inmate app sends the message to the inmate app on the inmate's computing device through a wired or wireless network such as the Internet. The message can be monitored and/or separately received and processed at a server (such as server 53 of FIG. 5), which records, flags, permits, or takes other appropriate action based on the message. For example, the server may maintain a database of all messages requesting calls from the inmate. In another example, the server maintains a copy of the message and provides the message to the inmate device when the inmate app is next accessed (e.g., logged into using the inmate's name, password, etc.) by the inmate. In another example, the non-inmate app and/or the server send a notification to the inmate's device which provides a notification of the message even in circumstances in which the inmate app is not currently open/executing on the inmate device.

After receiving the message at the inmate calling app, method 1 next involves displaying some or all of the content of the message at the inmate calling app, including a request for the inmate to call the outside party during a time period, as shown in block 4. For example, a "call me now" message may display a request "Call Mom now," based on the "call me now" request coming from an outside party app at which the inmate's mother has logged in or otherwise identified herself.

Method 1 next involve receiving input to initiate a VOIP call between the inmate app on the inmate device and the outside party app on the outside party device, as shown in block 6. For example, the inmate may select one or more controls within the inmate app to initiate the call. In another example, the inmate clicks on/taps on/selects a command shown in the displayed message. For example, the message may say "Call Mom now. Click here to call" and a click/tap/selection on the message or a particular part of the message may be received as input to initiate the call to the inmate's mom's calling app.

After receiving the input to initiate the VOIP call, the method 1 determines if the VOIP call is within the time period, as shown in block 8, and establishes the VOIP call between the inmate app and the outside party app, as shown in block 9. For example, if the message indicates a time period of 1 pm to 2 pm, the method determines whether the current time (of the VOIP call that was just initiated) is between 1 pm and 2 pm. In the case of an inmate and non-inmate in different time zones, the method 1 performs a time-zone conversion to ensure that the inmate call is occurring within the time period specified in the message. In another example, the message indicates a time period of today and the method 1 determines whether the VOIP call is initiated on the same day the message was received. In another example, the message indicates a time period of now and the method 1 determines whether the input to initiate the VOIP call is received within a predetermined length of time (e.g., 5 minutes, 10 minutes, 15, minutes, 30 minutes, 1 hour, etc.) after the sending or receiving of the message from the outside party app. The predetermined length of time can be specified by the inmate, non-inmate, the institutional staff, or otherwise set based on experience, preferences, and/or circumstances. In other examples, both the starting time and ending time are determined for the time period in the message. For example, if the message specifies a time period of this afternoon, a start time of noon and an end time of 5:00 pm can be determined based on "afternoon."

In one embodiment of the invention, based on determining whether the VOIP call is within the time period, the method 1 determines whether the VOIP call is permitted. In this embodiment, only calls within the time period are permitted. In another embodiment of the invention, calls within the time period are automatically permitted and calls outside the time period are permitted subject to additional constraints, limitations, monitoring. For example, a single call (or limited number of calls) outside of the time period may be permitted to allow the inmate to leave a message. As a specific example, if the message identifies this afternoon as the time period, then calls after 5:00 pm (or other ending threshold time), are limited so that the inmate may only call once after 5:00 pm.

In another embodiment of the invention, the inmate calling app reminds or otherwise notifies the inmate of the start of a time period. For example, if the message from the non-inmate requests that the inmate call the non-inmate between 1 pm and 2 pm, the inmate's app may pop-up or otherwise provide a notification to the inmate at 1 pm (e.g., "It is now 1 pm, your received a request from Mom to call between 1 pm and 2 pm, click here to call her now." In this example, the notification also identifies the end time of the time period. In another example, the notification identifies an amount of time remaining in the time period, e.g., "You have 8 minutes remaining to call Mom," etc.

Figure 2:
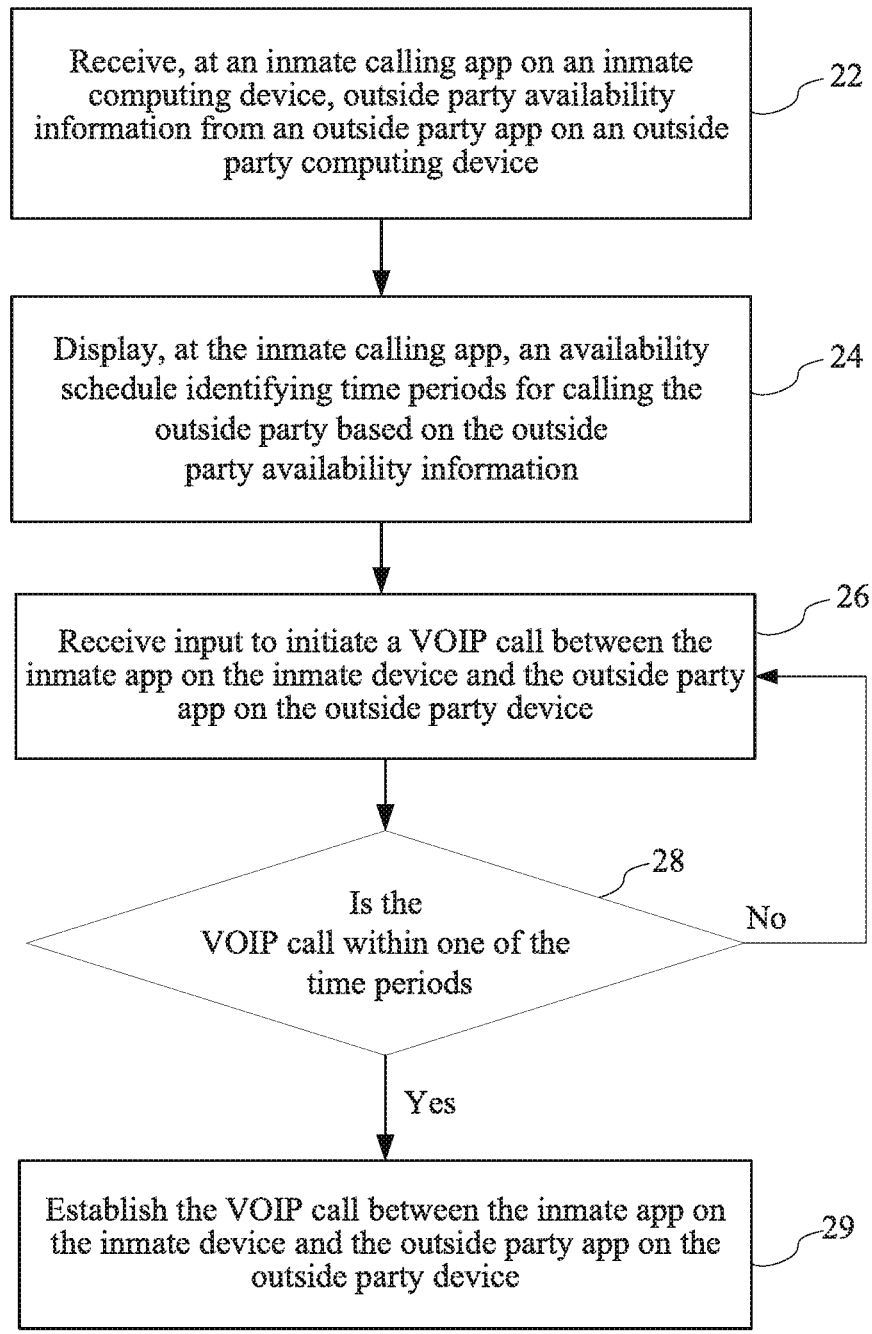
FIG. 2 is a flow chart illustrating an exemplary method of establishing a VOIP call based on outside party availability information received from an outside party app.

FIG. 2 is a flow chart illustrating an exemplary method 21 of establishing a VOIP call based on outside party availability information received from an outside party app. The exemplary method 21 can be implemented by an inmate device such as by apps 59*a-c* on one of inmate devices 57*a-c* (FIG. 5), although other devices and configurations can also be implemented. The exemplary method 21 can be implemented by storing and executing instructions in a non-transitory computer-readable medium. Reference to the method 21 being performed by a computing device includes the method 21 being performed by one or more computing devices.

Method 21 involves receiving, at an inmate calling app on an inmate computing device, outside party availability information from an outside party app on an outside party computing device, as shown in block 22. For example, the mother, father, brother, sister, child, or friend of the inmate may open the non-inmate app on a tablet, mobile phone, laptop, or desktop computing device and identify blocks of time that he or she will be available and/or blocks of time that he or she will not be available for calls from the inmate. The outside party calling app may present a calendar or other interface that receives input specifying the non-inmate's available and not-available periods of time. Recurring and non-recurring blocks of time can be identified. For example, the non-inmate may identify unavailability every Sunday morning based on church commitments, unavailability Monday-Friday from 9 am-5 pm based on work commitments, etc. The non-inmate app sends the availability information to the inmate app on the inmate's computing device through a wired or wireless network such as the Internet. In one implementation, the availability information is sent based on detecting that the availability information has changed, e.g., when the non-inmate adds a new available period, deletes an existing availability block, or changes an existing availability block. In addition, or the alternative, the availability information can be provided periodically and/or based on an event, such as the non-inmate opening the non-inmate app or the non-inmate sending a text, voice-recording, document, or other message to the inmate.

The availability information that is provided can be monitored and/or separately received and processed at a server (such as server 53 of FIG. 5), which records, flags, permits, or takes other appropriate action based on the availability information. For example, the server may maintain a database of availability of all of an inmate's contacts' availabilities. In another example, the server maintains a copy of the availability information and provides the availability information (or a relevant portion of it) to the inmate device when the inmate app is next accessed (e.g., logged into using the inmate's name, password, etc.) by the inmate. In another example, the non-inmate app and/or the server send a notification to the inmate's device which provides a notification of the new/changed availability information even in circumstances in which the inmate app is not currently open/executing on the inmate device.

The availability information identifies one or more time periods for calling the outside party. For example, the availability information may include "do not call" blocks of time and other time periods are considered available. For example, if the "do not call" blocks identify unavailability prior to noon and unavailability after 2:00 pm, then the time period from noon to 2:00 pm can be identified as a time period for calling the outside party based on that availability information.

Method 21 next involve receiving input to initiate a VOIP call between the inmate app on the inmate device and the outside party app on the outside party device, as shown in block 26. For example, the inmate may select one or more controls within the inmate app to initiate the call. In another example, the inmate clicks on/taps on/selects a command shown in the displayed availability information. For example, the availability information may include a listing of available time periods and a selectable icon or link to "Call this person now. Click here to call" and a click/tap/selection on the icon or link may be received as input to initiate the call to that non-inmate's calling app.

In another embodiment, a user interface displays availability information for multiple non-inmates to the inmate. For example, the interface may show that the inmate's mom is available from noon to 1:00 pm while the inmate's dad is available from noon to 3:00 pm. Such information can assist the inmate in planning, prioritizing, and/or otherwise scheduling his or her calls. In the above example, the inmate may choose to call his mom before calling his dad since his dad has more availability.

After receiving the input to initiate the VOIP call, the method 21 determines if the VOIP call is within one of the time periods, as shown in block 28, and establishes the VOIP call between the inmate app and the outside party app, as shown in block 29. For example, if the available time periods indicate a single available time period of 1 pm to 2 pm, the method determines whether the current time of the VOIP call just initiated is between 1 pm and 2 pm. Time period checks can be performed using similar techniques as those discussed above with respect to block 8 of FIG. 1.

In one embodiment of the invention, based on determining whether the VOIP call is within one of the time periods, the method 21 determines whether the VOIP call is permitted. In this embodiment, only calls within one of the time periods are permitted. In another embodiment of the invention, calls within one of the available time periods are automatically permitted and calls outside of the time periods are permitted subject to additional constraints, limitations, monitoring. For example, a single call (or limited number of calls) outside of the available time periods may be permitted to allow the inmate to leave a message. As a specific example, if this afternoon is the only available time period, then calls after 5:00 pm (or other afternoon ending threshold time), are limited so that the inmate can only may one call once after 5:00 pm.

In another embodiment, different time periods have different call permissions based on input from the non-inmate. For example, the non-inmate could specify three different types of time periods: available, maybe available, and unavailable, with different calling permissions for each. In this example, during available time periods, the inmate is permitted to call X (e.g., 10) times and leave Y (e.g., 2) voice messages. During maybe available time periods, the inmate is permitted to call Z (e.g., 2) times, and leave W (e.g, voice messages), and during unavailable time periods, the inmate may be restricted to only leaving V (e.g., 1) voice messages. In one such implementation, the values V, W, X, Y, and Z are specified by the non-inmate, e.g., as part of the non-inmate's preferences. In another implementation, default and/or fixed values for these thresholds are predetermined by the system configuration and/or by the facility. The types of availability options, the restrictions placed on the availability options, and other configuration options can additionally or alternatively be based on the account associated with the inmate and/or non-inmate. More expensive accounts can provide access to more customization, more features, and/or fewer restrictions.

In another embodiment of the invention, the inmate calling app reminds or otherwise notifies the inmate of the start of time periods of availability. For example, if the availability information from the non-inmate identifies 1 pm to 2 pm as an available time period and 5 pm to 6 pm as another available time period, the inmate's app may pop-up or otherwise provide notifications to the inmate at the starts of the time periods, i.e., at 1 pm and 5 pm. Such notifications, can identify information about the current time periods (e.g., start time, end time, time remaining, time period type, etc.) as well as future time periods (e.g., next available time period start time, a not available again today/this week message, etc.).

ii. Inmate Availability

Outside parties are enabled to receive inmate availability in other embodiments of the invention. In one embodiment of the invention, when the inmate launches the app or selects an "I am available" option within the app, the app sends a communication over the network to one or more outside party devices and a graphic or other message is displayed on those devices letting the outside parties know that the inmate is available to receive or place a call. The outside parties can then select an option to call the inmate. If the outside parties do not see that the inmate is available, they can avoid wasting their time and the system's resources with unsuccessful call attempts. The outside parties to whom inmate availability information is provided can be controlled, restricted, and/or monitored by the institution, law enforcement, or other authority. In one example, outside parties only receive or have access to inmate availability information after being approved in an approval process.

In other embodiments of the invention, additional details about the inmate's availability are shared with the one or more outside parties, including but not limited to, the time or time periods of availability, indications of how preferable/convenient a call would be at this time and other times, and/or custom messages relating to the inmate's availability.

Generally, any availability selections or messages can be provided to the institution or other monitoring service to monitor for abuse. The exemplary messages described above are merely examples and the availability information that is shared from the inmate device. Such messages can use any form that is appropriate for the implementation and/or circumstances.

iii. Institution Restrictions and Privileges

Outside parties and inmates can additionally or alternatively be informed of institution policies, events, and other restrictions that relate to the timing of inmate calls. For example, an institution can set regular calling hours for inmate calls and the inmate and outside party device apps can identify these hours and/or only provide call availability information for the other party during those hours.

In addition, the institution can grant privileges for additional calling hours for special events and holidays, or as good behavior rewards, and apply such privileged to all or select inmates. The inmate and calling party device apps can reflect these special privileges and circumstances in the calling restriction information that is presented.

In addition, the institution can grant selective calling privileges to particular inmates and/or groups of inmates at particular times of day, days of the week, etc. to distribute the load on the system resources more evenly over time or to achieve other computing advantages. Doing so can reduce the bandwidth requirements of the system overall and thus reduce the overall operating costs of the system.

In addition, certain types of calls can be allowed at certain times and/or be prioritized. For example, inmates may be permitted to call attorneys and counsellors at any time the attorneys or counsellors are available, during any business hours (e.g., 8 am-5 pm Monday-Friday), etc., but only allowed to call family and other outside parties on weekends, etc. In another example, calls at certain times of day are provided at reduced cost. In another example, the cost of a call at a particular time is based on the network usage or other criteria that changes over time. The inmate and/or outside parties can be notified when the current rate of a potential call drops below system-specified thresholds or user-specified thresholds.

Implementing such controls accounts for the different identities of the parties using the outside party device apps. In such cases, as well as other circumstances, the outside party may be required to register (e.g., provide proof of attorney status and attorney representation or other credentials) on the app or otherwise.

The institution may also allow or restrict calls or specify particular calling hours or restrictions based on the type of the outside party (e.g., immediate family, extended family, friend, attorney, counselor, law enforcement) or the particular outside party's identity (e.g., mom, wife, attorney John Doe) from whom calls are received. For example, an institution can allow an inmate's attorney to call the inmate and vice versa at any time the inmate is available, while allowing the inmate to call family during specified hours, and not allowing the family to call the inmate. A lawyer soliciting an inmate as a client, on the other hand, may only be able to contact the inmates during specified hours and may be restricted or prevented from making calls to the inmates if signs of abuse or harassing behavior are detected. The time restrictions and privilege information is presented to the inmates and outside parties so that they can plan their calls accordingly.

In another example, the institution is able to implement a policy that grants an inmate additional calling privileges based on a particular circumstance. For example, inmates can be granted additional calling hours based on upcoming hearing dates, births of loved one, funerals, and the like.

Figure 3:
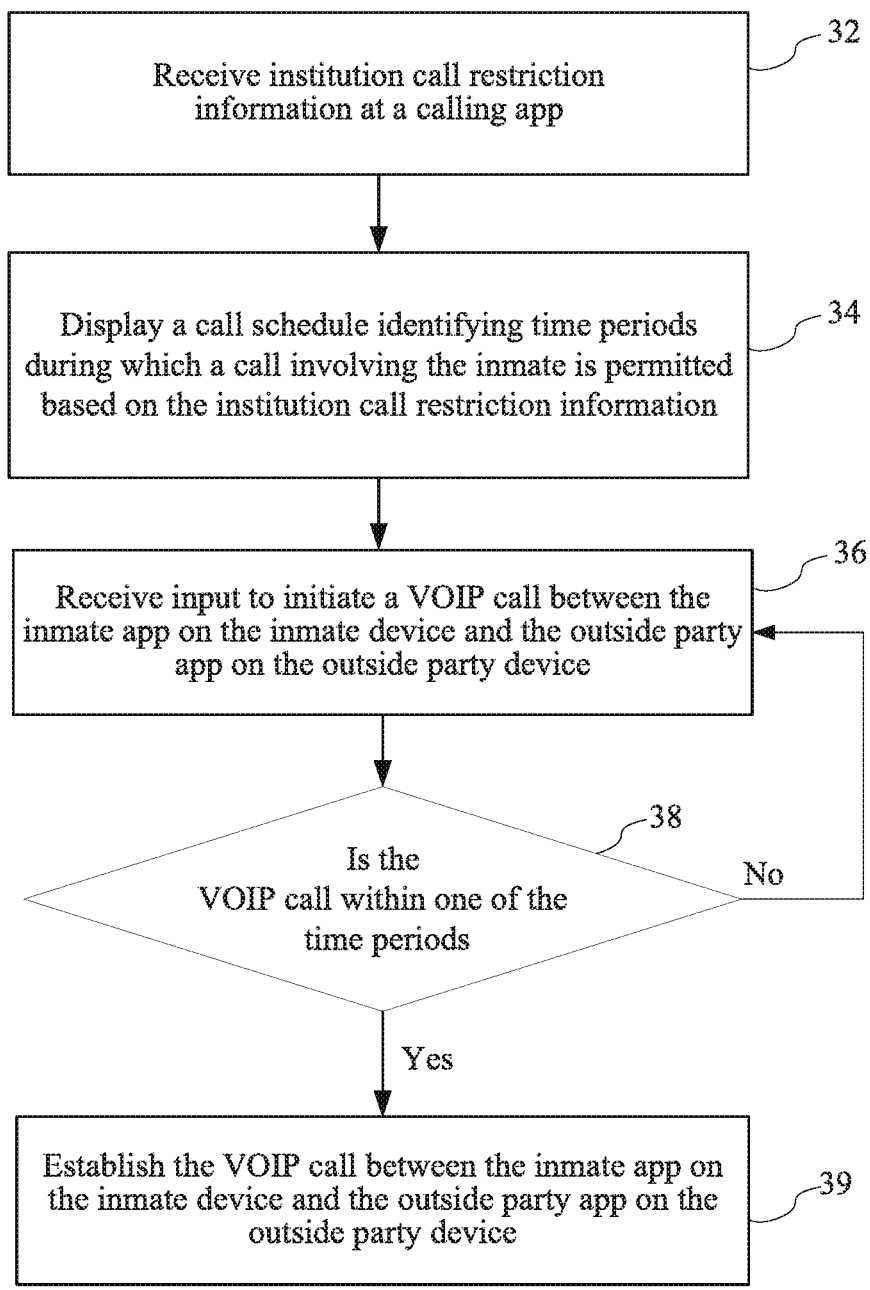
FIG. 3 is a flow chart illustrating an exemplary method of establishing a VOIP call based on an institution's call restriction information.

FIG. 3 is a flow chart illustrating an exemplary method 31 of establishing a VOIP call based on an institution's call restriction information. The exemplary method 31 can be implemented by an inmate device such as by apps 59a-c on one of inmate devices 57a-c (FIG. 5), although other devices and configurations can also be implemented. The exemplary method 1 can be implemented by storing and executing instructions in a non-transitory computer-readable medium. Reference to the method 31 being performed by a computing device includes the method 31 being performed by one or more computing devices.

Method 31 involves receiving, at an inmate calling app on an inmate computing device, institution call restriction information, as shown in block 32. As examples, an institution may specify that no inmate may make a call after 10 pm, that a particular inmate may not make calls except on Sunday, that non-inmates under the age of 10 may not receive calls after 8 pm, and/or that a particular non-inmate may not receive calls during workday business hours. The institution call restriction information can be stored at a server (such as server 53 of FIG. 5). For example, the server may maintain a database of institution call restriction information.

Method 31 displays a call schedule identifying time periods during which a call involving the inmate is permitted based on the institution call restriction information, as shown in block 34. For example, the inmate and/or a non-inmate wishing to have a call with the inmate may view a calendar that identifies one or more upcoming days and time periods during the one or more days during which the inmate and/or non-inmate could have a call based on the institution call restriction information.

Method 31 next involves receiving input to initiate a VOIP call between the inmate app on the inmate device and the outside party app on the outside party device, as shown in block 36. The input can come from the inmate or the outside party on their respective apps. For example, the inmate may select one or more controls within the inmate app to initiate the call.

After receiving the input to initiate the VOIP call, the method 31 determines if the VOIP call is within one of the time periods, as shown in block 38, and establishes the VOIP call between the inmate app and the outside party app, as shown in block 39. For example, the method 31 may determine whether the VOIP call is permitted or not permitted based on whether the call was placed within one of the time periods or not.

Calling Apps that Schedule Inmate Calls In Advance

Certain embodiments of the invention enable an inmate or outside party to schedule a call in advance. For example, the inmate may log onto his device's app and see that his wife is not available. The inmate selects a "schedule call" option in the app's user interface, selects a desired day, time, and/or duration for the call, and sends a call invitation to the outside party. The outside party receives the invitation for the call the next time she logs into the app on her device. If she accepts the invitation, a message is sent back to the inmate's device and the call is confirmed. Reminders can be provided to the inmate and/or outside party as the future time approaches, reminding them of the scheduled call. Moreover, if availability of the inmate changes (e.g., due to a change in the institution's calling hours, the inmate being punished, etc.), the system automatically determines to cancel and/or reschedule the call and sends in-app messages to both the inmate and the outside party. If the outside party rejects an invitation for a call, the inmate is notified. The outside party also can propose an alternative day and/or time for the call so that an invitation for the altered day/time is sent to the inmate for the inmate to accept or reject.

Certain embodiments of the invention allow the inmate and outside party to share calendars with one another so that the respective parties can identify appropriate and convenient times for a call. The inmate's schedule can identify the institution's time restrictions (e.g., calling hours, dining times, visiting hours, etc.) as well as specific items entered by the inmate (e.g., counseling session, haircut, medical visit, etc.). The outside party's calendar can identify work hours, school hours, appointments, and other scheduled events and activities. In one embodiment of the invention, the app provides an option to automatically find and select the next available time on both calendars to schedule a call, e.g., find next time slot for ½ hour long call with inmate X, find next time slot for a 2-hour long call with attorney Y, etc.

Certain embodiments of the invention further allow the inmate and outside party to schedule sessions for counselling, social services, re-entry assistance, etc. For example, an inmate needing to schedule a weekly or monthly counseling session can use an automated scheduling process that, each week/month, identifies an open time on the inmate's calendar and/or the counsellor's calendar and schedules the session. The scheduling can be timed and/or repeated to determine when changing calendar availability requires rescheduling a session.

Calling Apps that Enable Outside Parties to Monitor Account Usage

The calling apps can additionally or alternatively be used to allow an outside party to monitor use of his or her account. An outside party will often establish an account with funds to pay for calls with the inmate. For example, a mother may create and account and provide $100 for the inmate to make calls. However, since the mother is paying (and perhaps additionally because she wants to keep her inmate son from further trouble), she wants to ensure that the funds are not used against her wishes. As examples, she may not want the inmate to call his brother for more than a half hour per week, she might not want to inmate to call a particular friend at all, she might want to know who the inmate calls with the account funds she provides, etc. Embodiments of the invention allow an outside party to set up an account with funds to pay for inmate calls and then to receive information about how those funds are used via the calling app on the outside party's device. For example, the app can provide notifications to the outside party whenever a call is initiated, while it is occurring, and when it concludes, identifying the called parties, the length of the call, the cost of the call, and any other information of use to the outside party. In addition, the app allows the outside party to monitor, control, and even discontinue the call when the call is between the inmate and another party using different devices than the outside party. In one example, the outside party determines to join the call or listen to the call. In another example, the outside party determines to terminate the call. In another example, the outside party determines to set a time limit on the call.

In another embodiment of the invention, the app allows the outside party who controls the account to permit or deny a call placed to another party. For example, the inmate can place a call to a friend. Before initiating the call with the friend's device, the inmate app communicates with the outside party's device to request permission for the call. For example, the outside party's app may present a message identifying that the inmate is attempting to place a call to a particular number and/or person and asking the outside party to grant or deny permission for the call.

Figure 4:
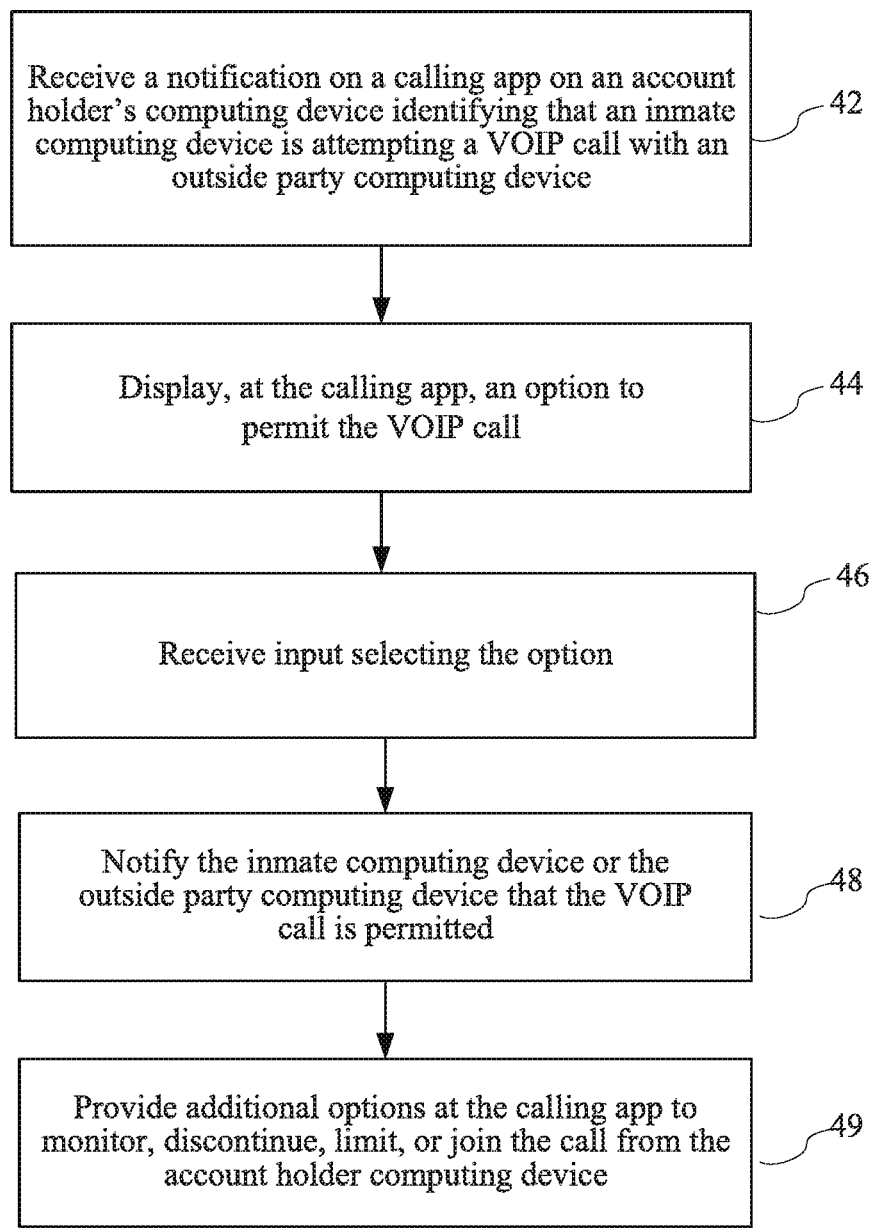
FIG. 4 is a flow chart illustrating an exemplary method of permitting an inmate VOIP call with an outside party based on input using a calling app on an account holder's computing device.

FIG. 4 is a flow chart illustrating an exemplary method 41 of permitting an inmate VOIP call with an outside party computing device based on input using a calling app on an account holder's computing device. The exemplary method 41 can be implemented by a non-inmate device such as by apps 59*d-c* on one of inmate devices 52*a-c* (FIG. 5) and/or using a server, such as server 53 (FIG. 5), although other devices and configurations can also be used for other implementations. The exemplary method 41 can be implemented by storing and executing instructions in a non-transitory computer-readable medium. Reference to the method 41 being performed by a computing device includes the method 41 being performed by one or more computing devices.

Method 41 involves receiving a notification on a calling app on an account holder's computing device, as shown in block 42. The notification identifies that an inmate computing device associated with the account is attempting a VOIP call with an outside party computing device. In one embodiment of the invention, when the inmate initiates the call, a message is sent from a calling app on the inmate's device to the account holder's device and/or to a server that contacts the account holder's device. In either of these exemplary implementations, the account holder's device receives a message that the inmate is attempting a call. The account holder, in one example, is presented with a notification about the attempt. The notification can identify various attributes of the attempt including, but not limited to, one or more of the time of the call, the phone number/device/person called, the last time the inmate contacted that number/device/person, the current state of the account (time or data used so far in the current period, time or data remaining available in the current period, etc.), and other information about the attempted call and/or account. In one example, the account holder configures/personalized which information is included in the notification by selecting which of the available types of information to include in the notifications.

Method 41 additionally or alternatively displays an option, at the calling app, to permit the VOIP call, as shown in block 44. For example, the option can include an allow user interface selectable icon and a reject user interface selectable icon for the account holder to select. In another embodiment, a time period is specified for a response. For example, the option can display a message "John Doe is attempting to call Jane Doe, press here in 15 seconds to block the call," and only blocking the call if the recipient does not select the block option within the specified time limit. This ensures that the inmate's calls are not blocked simply because the account holder is asleep, at work, or otherwise unavailable to expressly grant permission for the call.

Method 41 further involves receiving input selecting the allow option, as shown in block 46, and notifying the inmate computing device and/or the outside computing device that the VOIP call is permitted, as shown in block 48. The devices can then connect the call and allow the inmate and outside party to conduct the call.

Method 41 further involves providing additional options at the calling app at the account holder's computing device to allow the account holder to monitor, discontinue, limit, and/or join the call from the account holder computing device, as shown in block 49. For example, the account holder may select to limit the duration of the call to 15 minutes and may choose to listen in on the call. The inmate and outside party can be notified of the limitations, monitoring, joining, etc. In one example, the account holder chooses to record the call. As a result, the system (computing device or server) records the audio (and video during a video call) during the call and makes that recording available to the account holder after the call. The call participants can be notified of the recording of the call.

Calling Apps that Manage Internet Usage

Certain embodiments of the invention provide information to the user about the network and other requirements for performing the call. For example, when a call is initiated that uses the outside party's Internet connection, a warning or other message can be displayed that identifies the approximate data requirements for the call, e.g., X Gigabytes/minute are required for the call, etc. This allows the outside party to ensure that he or she does not exceed the Internet access capabilities for inmate calls. In one embodiment of the invention, the outside party uses the app to set a data usage limit, e.g., max Y Gigabytes per week, to ensure that data usage does not exceed the outside party's Internet capabilities without express additional authorization from the outside party.

Calling Apps that Track Contacts and Tasks

Certain embodiments of the invention use a calling app to share contacts and tasks between an inmate and an outside party. For example, the inmate may have a list of attorneys, legal contacts, witnesses, and supporters that the inmate is able to share with his attorney, family, and anyone else helping him or her with preparing a legal defense in an upcoming hearing. Similarly, the calling app in another embodiment keeps track of a to-do list that both the inmate and the outside party can see and change. In one example, the institution provides a list of to-do tasks for new inmates and their families that is shared using the inmate and outside party apps. The inmate, outside party, and the institution are thus able to track when items on the list are marked as completed and to send reminders and follow up requests when they are not.

Calling Apps that Facilitate Education and Tutoring

Certain embodiments of the invention use a calling app to share education related materials between an inmate and an outside teacher, student, child, or other person. For example, an inmate can use a screen sharing and/or collaboration feature on the calling app to help a child with an essay, book report, math worksheet, etc. In another example, the app provides tracking functionality that allows tracking of the inmate's or outside party's progress in one or more educational activities. For example, the calling app can track a number of calling sessions or an amount of time associated with a particular outside caller (e.g., the inmate's son, etc.) or for a particular activity (e.g., attending an audio lecture using the calling app, collaborating on an essay, etc.).

Calling Apps that Are Also Used After Inmate Release

The apps on the outside party devices and/or inmate devices can continue to be used after an inmate is released from the institution. The former inmate and outside party may wish to continue to use the app to share calendars, contacts, tasks, and other information and to make calls with one another and other parties. For example, the inmate may use the app to call a parole officer who can use the app to verify the inmate's location, schedule calls based on availability, and use other functions of the app to share information with the inmate. In one example, the former inmate is given a SIM card with 30 days of leaving the institution so that the inmate has the option to continue using the app.

A. Exemplary System

Figure 5:
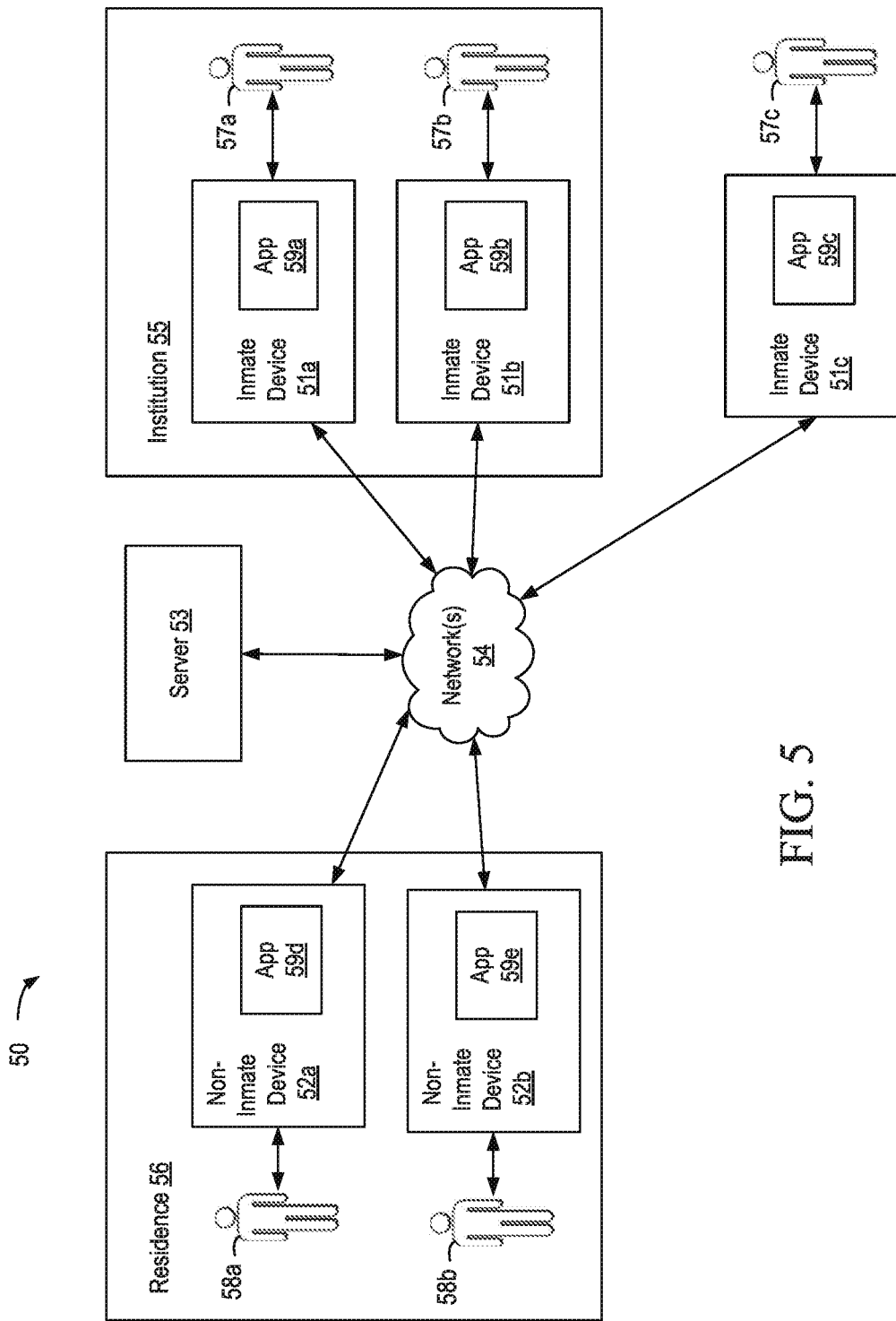
FIG. 5 is a diagram of an environment in which one or more embodiments of the invention can be practiced.

FIG. 5 is a diagram of an environment in which one or more embodiments of the present disclosure can be practiced. The system configuration of FIG. 5 is provided as one example of a system configuration. In a particular implementation, devices and the communications between them as well as the allocation of functionality amongst the multiple devices involved can be configured differently depending upon the particular circumstances of the implementation.

In FIG. 5, inmate devices 51*a*-*c* are used by inmates 57*a*-*c*, respectively. In this example, inmates 57*a*-*b* are within the institution 55, while inmate 57*c* is outside of the institution 55. Non-inmate devices 52*a*-*b* are used by non-inmates 58*a*-*b* within residence 56. In alternative examples, non-inmates will reside in different locations from one another. Each of the devices 51*a*-*c*, 52*a*-*b* includes a calling app 59*a*-*e* used by the user to place calls, send messages, receive messages, and for other purposes related to communications with and information about the inmates, non-inmates, and the institution. For example, a non-inmate can send a message using the app 59*d* on non-inmate device 52*a* via network 54 to app 59*a* on inmate device 51*a*. In this example, such a message identifies a time period (e.g., now) for the inmate 57*a* to call non-inmate 58*a*. In response to receiving the message, the app 59*a* can display a notification/message telling the inmate 57*a* to call the non-inmate 58*a*. The inmate 57*a* can then initiate a call using the app 59*a* to the app 59*d*. A device (e.g., inmate device 51*a*, server 53, or non-inmate device 52*a*) then determines if the call is within the specified time period. In this example, the call is permitted based on the call being within the specified time period and a call between the inmate using app 59*a* and the non-inmate 58*a* using app 59*d* is connected and allowed to proceed, e.g., with voice communications (e.g., VOIP) being transmitted via network 54 between the apps 59*a*, 59*d*.

Figure 6:
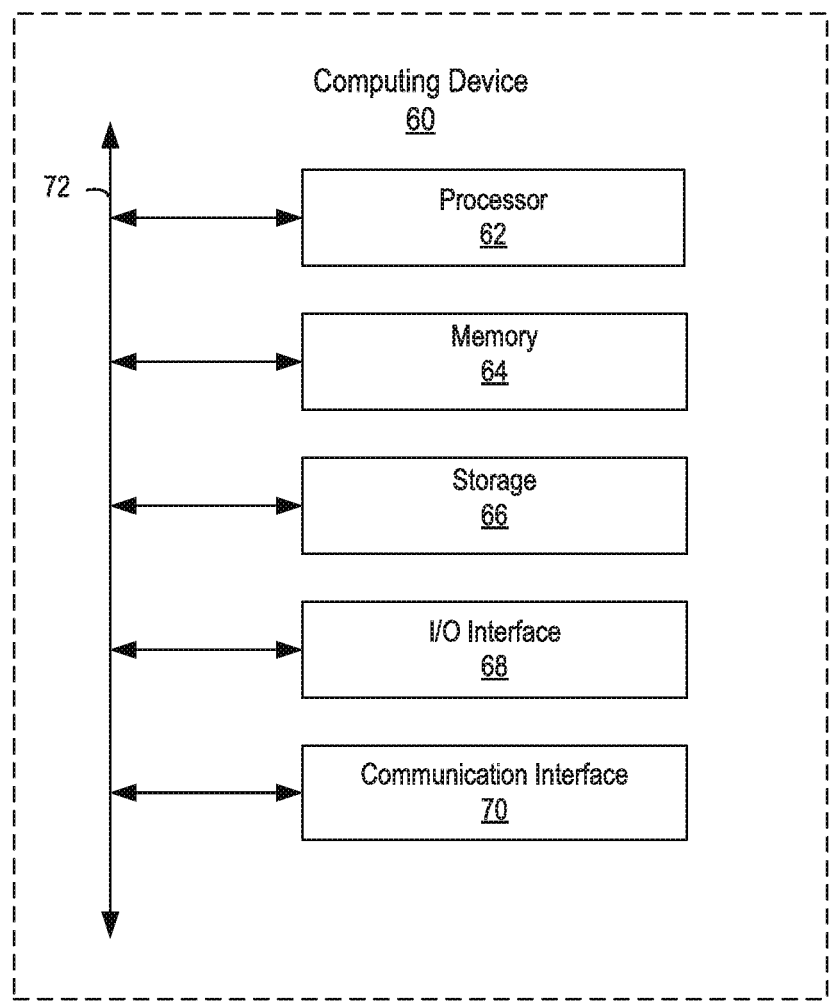
FIG. 6 is a block diagram depicting an example hardware implementation.

FIG. 6 is a block diagram depicting example hardware implementations for the servers and devices described in FIG. 5. Each such server or device 60 may include a processor 62 that is communicatively coupled to memory 64 and storage 66 and that executes computer-executable program code and/or access information stored in the memory 64 and storage 66. The processor 62 may comprise a microprocessor, an application-specific integrated circuit ("ASIC"), a state machine, or other processing device. The processor 62 can include any of a number of processing devices, including one. Such a processor 62 can include or may be in communication with a computer-readable medium storing instructions that, when executed by the process, cause the processor to perform the operations described herein.

The memory 64 and storage 66 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 60 may also comprise a number of external or internal devices such as input or output devices. For example, the device 60 may have input/output ("I/O") interface 68 that can receive input from input devices or provide output to output devices. A bus 72 can also be included in the device 60. The bus 72 can communicatively couple one or more components of the server. The server can execute program code that configures the processor to perform one or more of the operations described above with respect to the Figures. The program code may be inmate in the memory or any suitable computer-readable medium and may be executed by the processor or any other suitable processor. In additional or alternative embodiments, program code can be resident in a memory that is accessible via a data network, such as a memory accessible to a cloud service.

The device 60 can also include at least one network interface device or other communication interface 70. The communication interface 70 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by patent laws. It is to be understood that the embodiments shown and described herein are only illustrative of the principles of the present invention and that various modification may be implemented by those skilled in the art without departing from the scope and spirit of the invention.

What is claimed is:

1. A method for establishing a video call between an inmate device used by an inmate and an outside party computing device used by an outside party, the method comprising:
    receiving, at an inmate calling app on the inmate device, a message from an outside party app on the outside party computing device;
    displaying the message at the inmate calling app, wherein displaying the message comprises displaying a request for the inmate to initiate a video call to the outside party device according to a time constraint;
    receiving input to initiate the video call between the inmate app on the inmate device and the outside party app on the outside party device;
    determining that the video call is permitted based on the time constraint; and
    based on determining that the video call is permitted, establishing the video call between the inmate app on the inmate device and the outside party app on the outside party device.

2. The method of claim 1, wherein the time constraint requires that the inmate call the outside party during a time period.

3. The method of claim 2 further comprises determining the time period based on the message.

4. The method of claim 3, wherein determining the time period based on the message comprises determining that the time period is now based on the message, wherein displaying the message displays text or a graphic indicating that the inmate should call the outside party now.

5. The method of claim 4, wherein the time period is now and determining that the video call is permitted comprises determining whether the input to initiate the video call is received within a predetermined length of time after receiving the message from the outside party app.

6. The method of claim 3, wherein determining the time period based on the message comprises determining that the time period is today based on the message.

7. The method of claim 1, wherein determining the time period based on the message comprises determining the time period based on a starting time and an ending time for the time period included in the message.

8. The method of claim 1 further comprising providing a notification at the start of the time period indicating that the inmate is permitted to call the outside party during the time period.

9. The method of claim 1 further comprising providing a notification in the inmate calling app at a start of a time period indicating that the inmate is permitted to call the outside party during the time period.

10. A method for establishing a video call between an inmate device used by an inmate and an outside party computing device used by an outside party based on outside party availability information, the method comprising:
   receiving, at an inmate calling app on the inmate device, the outside party availability information from an outside party app on the outside party computing device;
   displaying, at the inmate calling app, an availability schedule identifying a time constraint for calling the outside party device based on the outside party availability information;
   receiving input to initiate a video call between the inmate app on the inmate device and the outside party app on the outside party device;
   determining that the video call is permitted based on determining that the video call accords with the time constraint; and
   based on determining that the VOIP call is permitted, establishing the video call between the inmate app on the inmate device and the outside party app on the outside party device.

11. The method of claim 10 further comprising providing a notification at the inmate calling app at the start of the time period indicating that the inmate is permitted to call the outside party.

12. The method of claim 11, wherein the notification identifies an end time of a current time period during which the inmate is currently permitted to initiate a video call to the outside party.

13. A method for establishing a video call between the inmate device used by an inmate and an outside party computing device used by an outside party, the method comprising:
   receiving institution call restriction information at a calling app on the inmate device or the outside party computing device;
   displaying, at the calling app, a call schedule identifying a time period during which a call involving the inmate is permitted based on the institution call restriction information;
   receiving input to initiate a video call between the inmate device and the outside party computing device;
   determining that the video call is permitted based on determining that the video call is within the time period; and
   based on determining that the video call is permitted, establishing the video call between inmate device and the outside party computing device.

14. The method of claim 13 further comprising providing a notification in the calling app at the start of the time period indicating that a call with the inmate is currently permitted.

15. The method of claim 14, wherein the notification identifies an end time of the time period.

* * * * *

UNITED STATES PATENT AND TRADEMARK OFFICE
CERTIFICATE OF CORRECTION

PATENT NO. : 10,728,290 B1
APPLICATION NO. : 16/407758
DATED : July 28, 2020
INVENTOR(S) : Todd Russell Thomasson et al.

Page 1 of 1

It is certified that error appears in the above-identified patent and that said Letters Patent is hereby corrected as shown below:

On the Title Page

Line 6 of Item (57) Abstract reads:
"on an outside party computing device is receive by an inmate"
It should read:
--on an outside party computing device is received by an inmate--

Signed and Sealed this
Twenty-second Day of September, 2020

Andrei Iancu
*Director of the United States Patent and Trademark Office*